Nov. 7, 1933.  N. C. NICKERSON  1,933,924
EXCAVATOR
Filed May 14, 1932
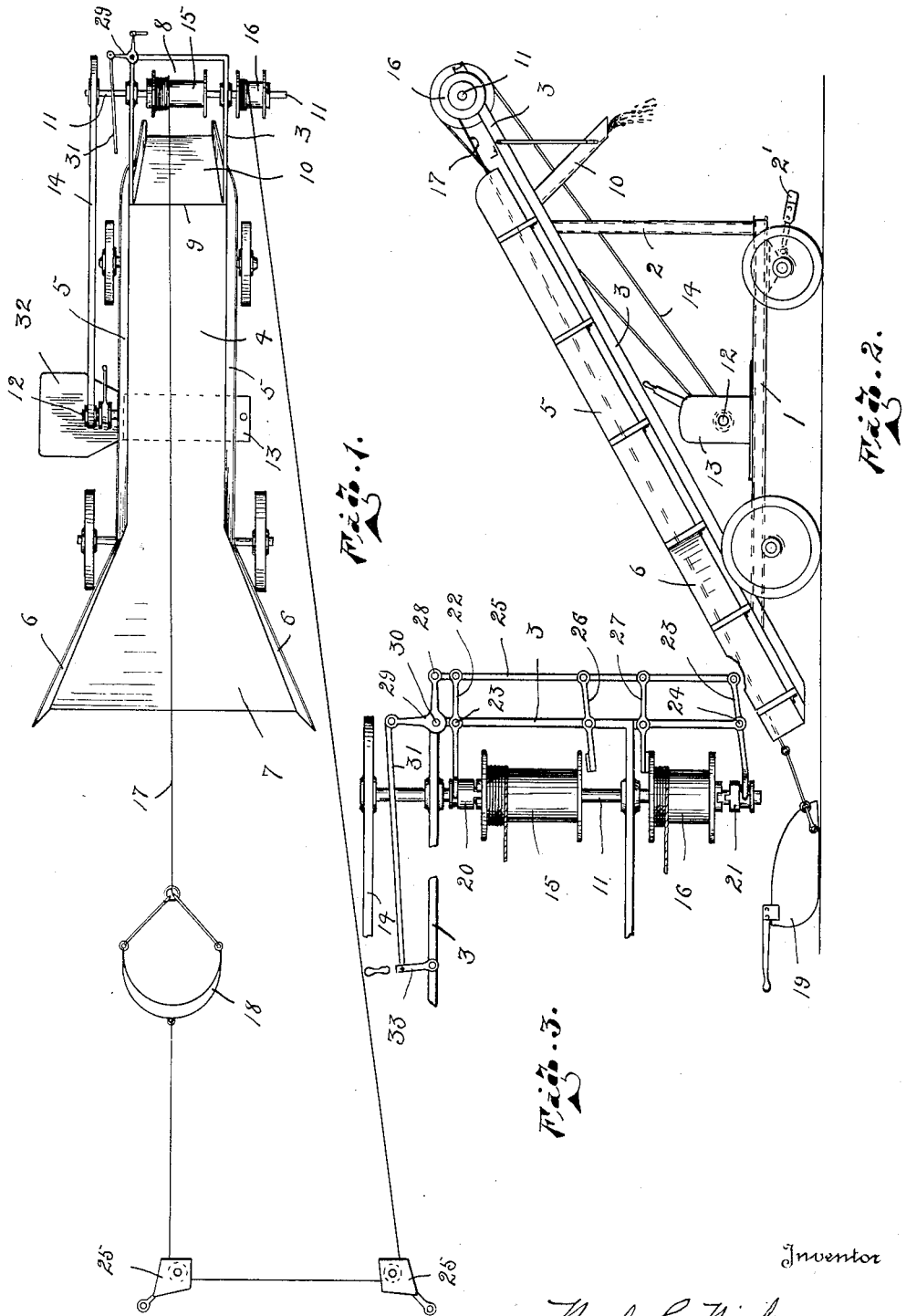
Inventor
Neal C. Nickerson.
By Geo. Stevens.
Attorney Patented Nov. 7, 1933

1,933,924

UNITED STATES PATENT OFFICE 1,933,924

EXCAVATOR

Neal C. Nickerson, Carlton, Minn.

Application May 14, 1932. Serial No. 611,318

5 Claims. (Cl. 214—105)

This invention relates to excavators and has special reference to what is commonly known as a drag line excavator including the triplicate functioning of excavating, conveying and loading.

The principal object is to produce such a machine of simple and compact design, and one capable of most ready adjustment and transportation to easily accommodate itself to many different classes of work.

Another object is to produce such a machine having a simple arrangement of winding and unwinding winch mechanism.

Still other objects and advantages of the invention will appear in the following description thereof.

Referring now to the accompanying drawing forming part of this application, and wherein like references indicate like parts:

Figure 1 is a top plan view of one of the improved excavating units as it might appear in operation;

Figure 2 is a side elevation of Figure 1, showing the machine operated in connection with a common slip scraper; and Figure 3 is an enlarged elevation of a fragmental portion of the forward end of the excavator.

I am aware that somewhat similar devices are old in the art and that inclined trams or ramps have been used in combination with drag line mechanisms, but the unit as here illustrated has proven exceptionally practical, and is believed to contemplate many advantages over the art, as at present employed.

1 represents a common wagon chassis, the forward wheels of which are pivotally mounted so as to be readily turned in manipulating the unit exactly as a common four wheeled wagon is operated, and a removable tongue 2 is attached to the forward axle or wheels as the case may be for such purpose.

Upon the chassis 1 is fixed a triangularly shaped superstructure indicated at 2, the uppermost inclined members 3 of such superstructure extending above and beyond the front end of the superstructure, and the opposite end extending beyond and below the rearmost portion of the superstructure. Upon this inclined portion of the superstructure is mounted a preferably flat, smooth, ramp or tramway 4 having inclined sides 5 upon the straight portion thereof and inclined sides 6 upon the flared bottom portion 7 thereof, the side members 5 extending upwardly to within a short distance of the forward terminus of the frame like members 3, and the space within the forward end of the frame like members being open as at 8, forming a discharge hopper at the uppermost extremity 9 of the tramway.

At the extreme end of the tram there is provided a downwardly extending inclined chute or spout 10 for guiding or directing the material from the scraper into a wagon or other form of vehicle provided for the reception of such and not shown in the drawing.

Transverse the upper end of the frame members 3 is mounted a winch shaft 11 operated at one end from the shaft 12 of the motor 13 as by the belt 14 and suitable pulleys therefore, or if preferred a sprocket chain and sprocket wheels.

A drum 15 is loosely mounted upon the shaft 11, centrally of the upper end of the frame 3, and a like drum, though preferably of somewhat shorter length indicated at 16 is mounted upon the end of the shaft which protrudes beyond the frame 3, and upon the opposite side to that of the driving mechanism. These drums operate simultaneously, preferably in opposite directions, the one 15 for pulling the drag line or cable 17 and scraper or scoop of whatever type it may be, such, for example, as illustrated either at 18 or 19, towards the unit, while the drum 16 is for pulling the cable or line 17' in the opposite direction when the scraper is being returned for a subsequent load.

Each drum is provided with a suitable clutch mechanism, the one for the drum 15 indicated at 20, and that for the drum 16 at 21, these clutches being illustrated as of the common jaw clutch type and operated by the levers 22 and 23 respectively. The levers are each pivotally mounted as at 24 and operated by the reciprocable shifting rod 25 supported forwardly of and upon the front end of the frame 3 of the superstructure. The rod 25 is also attached to and operates the brake levers 26 and 27 for the drums 15 and 16 respectively, and these brake levers together with the clutch levers are so mounted than when the rod 25 is thrown in one direction one of the drums will wind up by the action of the shaft, while the other is released therefrom and free to unwind simultaneously with the latter's brake being applied to prevent undue racing action thereof. The rod 25 is connected as at 28 to one end of the bell-crank lever 29 which is pivoted as at 30 to the chassis frame, and which bell-crank lever is operated in any desired manner as by the rod 31 extending to any convenient position, preferably in easy reach of the platform 32 and there connect with any suitable operating lever 33.

By this means the entire operation of the device, except the manipulation of the scraper, is under the complete control of a single operator, and it is obvious that the arrangement of hoisting drums may be somewhat modified without departing from the spirit of the invention as set forth in the appended claims.

Attention is directed to the fact that in Figure 1 of the drawing what is known as a drag type of scraper is shown at 18, and where this type is used upon the device, it is essential that both drums 15 and 16 be employed for the manipulation thereof without the necessity of manual attention at the scraper. Whereas when a slip scraper as shown at 19, Figure 2, is used, only one drum may be essential for the pulling of same as the slip scraper may be returned to active position manually. In this latter case, and in the event of a machine of this type being built exclusively for such a scraper, the same may be materially cheapened in construction and only one drum employed, so that it is to be understood my invention contemplates the use of either one or two drums.

Having thus described my invention, what I claim and desire to secure by Letters Patent, is:

1. An excavator of the type described comprising a chassis, a superstructure upon the chassis, a ramp upon the superstructure terminating inwardly thereof at the uppermost end, a power shaft transverse the projecting upper end of the superstructure, winding drums loosely mounted upon the shaft, means for alternately rotatively engaging the drums with the shaft, and a power unit carried by the chassis for operating the shaft.

2. An excavator of the type described comprising a chassis, a triangularly shaped superstructure fixed upon the chassis, a ramp upon the superstructure, a power shaft transverse the projecting upper end of the superstructure, a pair of winding drums upon the shaft, means for alternately operating the drums by the action of the shaft, said means including a brake for each drum applicable only to the drums during unwinding action thereof.

3. In an excavating machine, an inclined frame, a driven shaft mounted upon the upper end of the frame, two drums mounted loosely upon the shaft, a clutch for each drum mounted on the shaft, a pair of levers for each drum fulcrumed upon the frame, one lever of each pair of levers to operate a clutch, the other lever of each pair of levers carrying a brake to engage a drum, and a shifting rod connected to all the levers for operating the levers simultaneously, all so arranged that when one drum is clutched to the shaft a brake engages the other drum to prevent racing.

4. An excavator unit for a self-contained excavating and loading machine comprising a wheeled chassis having a superstructure frame fixed thereon with one member thereof upstanding at the front of the chassis, and another member inclined and supported at one end by said upstanding front member and extending above and beyond the front member, the opposite end of said inclined member extending beyond and below the rear portion of the chassis, a ramp carried by said inclined member and having a flared lower end and outwardly inclined upstanding guiding sides, said sides terminating at their upper ends short of the forward end of the front end of the inclined frame member forming a discharge hopper for the ramp, a chute leading from the hopper, a winch shaft mounted transversely of the upper end of the inclined frame member, a drum loosely mounted on said shaft between the side members of the ramp frame, another loosely mounted drum on said shaft outside said frame, said drums being operable simultaneously in opposite directions, scraper carrying cables connected with said drums, one to be connected with the front and the other with the rear of a scraper, a clutch and brake for each of said drums, a reciprocable actuating rod mounted on said frame and connected with said brakes and clutches so that when the rod is moved in one direction one cable will be wound on the inside drum to move the scraper up the ramp towards the chute, the other cable being unwound from the outside drum and the brake simultaneously applied to the outside drum to prevent its racing, the cable to be wound on the outside drum to move the scraper away from the chute to loading position, a central control station on the chassis, and one-man actuating means for the winch shaft operable from the central station whereby the drums may be alternately operated to advance and retract the scraper.

5. In a self-contained excavating and loading machine, the combination of a wheeled chassis having an upstanding support at its forward end, an inclined ramp frame supported by the upper end of the support and the rear end of the chassis and extending beyond the ramp at its upper end and into proximity with the ground at its lower end, a cross shaft carried near the upper end of the frame and extending beyond both sides of the frame, drums loosely mounted on the shaft, one between the side members of the frame and the other outside of the frame, a clutch on the shaft for each drum, a brake for each drum, a driven pulley fixed to the shaft, clutch and brake operating levers mounted on the upper end of the frame, one of each kind of lever for each drum, an actuating rod so connected to all of the levers that when the clutch for one drum is engaged the brake for the other drum is actuated, a bell-crank mounted on the frame having one arm connected to the lever actuating rod, a central control station on the chassis, a shifting bar connected to the other arm of the bell-crank and extending to the control station, a power unit at the control station having a driving shaft, a loose driving pulley and clutch on said shaft, and means for engaging the clutch and the pulley to connect the driving pulley with the shaft, a power transmitting element connecting the driving pulley with the driven pulley on the cross shaft, a ramp on the frame having a flared lower end and upstanding outwardly inclined guiding sides, a chute at the upper end of the ramp to receive and direct material, a cable attached to each drum, one cable to be connected to the hauling bail of a loading scoop, the other cable to be passed around suitable directing devices and connected to the rear of a scoop, all constructed and arranged so that when one drum is operated the scoop will be drawn up the ramp to deliver its contents to the chute and the unclutched drum will be prevented from racing by its brake, and when the other drum is operated the scoop will be returned to the lower end of the ramp for another load and the loose drum will be prevented from racing by its brake whereby the machine may be governed by one person located at the central control station.

NEAL C. NICKERSON.